United States Patent Office 2,723,868
Patented Nov. 15, 1955

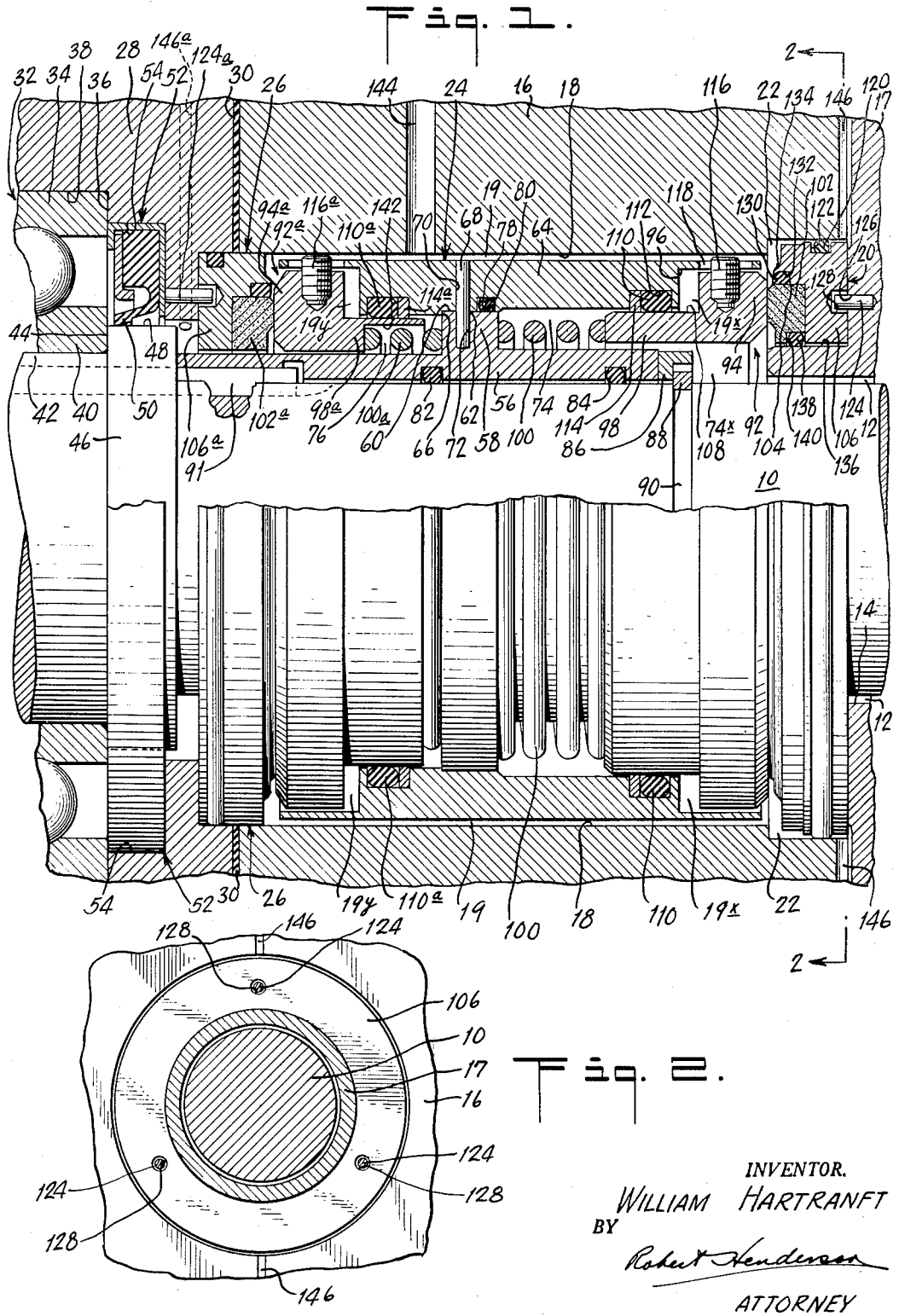

2,723,868

MECHANICAL SHAFT SEAL

William Hartranft, Palmyra, N. Y., assignor to The Garlock Packing Company, Palmyra, N. Y., a corporation of New York Application February 2, 1955, Serial No. 485,748

8 Claims. (Cl. 286—9)

The present invention relates to mechanical seals such as are employed for effecting a seal against the passage of fluids along a rotary shaft at an opening in a machine casing through which the shaft extends. For illustrative purposes, it is disclosed herein as adapted for the prevention of the escape of gas from a container into which such a shaft extends.

An important object of this invention is the provision of such a sealing device in which all its rotary parts are assembled and held together as a unit so that they may be installed and removed very easily to facilitate maintenance of the device and, more particularly, quick replacement of parts which may have become worn or which may have deteriorated from exposure to corrosive fluids.

Another important object is the provision of a seal which is highly effective against escape of gas from a chamber into which a rotary shaft extends.

Another important object is the provision of such a mechanical seal which includes readily removable and replaceable sealing seats with which rotary sealing rings in the device cooperate to yield a desired sealing effect.

Another important object is the provision of such a mechanical seal wherein the pressures of both the sealed fluid and a sealing liquid may operate to urge together two sealing rings which rotatively slide relatively to each other to prevent leakage therebetween.

The foregoing and other objects are achieved by the present invention, of which a preferred embodiment is illustrated in the accompanying drawing, in which—

Figure 1 is a substantially central, axial view of said preferred embodiment, the upper half of the seal being shown in radial-axial section and the lower half of the seal being shown in side elevation; and Fig. 2 is a cross-sectional view of the illustrated seal substantially on the line 2—2 of Fig. 1.

The illustrated seal may be employed either with a horizontal shaft or with a vertical shaft. It may be considered, however, for the purpose of the present description, as having been provided for use on a vertical shaft which extends downwardly through the top of a container which contains liquid; the lower end of the shaft carrying an agitator to agitate liquid. Within the container, above the level of the liquid, there is gas which must be prevented from escaping about the shaft, and the present seal prevents such escape of gas. It may be assumed that the right end of the shaft, as it appears in Fig. 1, is the lower part thereof which extends downwardly into the container and that the left end of the shaft is its upper end which is suitably connected to a motor which rotates it.

The present device preferably employs three important sealing principles; first, that relatively rotatable parts may be in one way or another gasketed to the shaft and to the surrounding machine-casing opening and may maintain a sliding inter-sealing effect, second, that a sealing liquid at a pressure slightly above the pressure of the sealed gas may oppose and prevent the latter from escaping from its container, and, third, that pressures of one or both of the sealed gas and a sealing liquid aid in maintaining a desired sealing effect.

In the drawing, a shaft 10, which is to be sealed, extends with some clearance at 12 within a shaft opening 14 in a fragmentarily shown body portion 17 of a container within which may be disposed liquids to be agitated or mixed by an agitator (not shown) fixed upon the lower or right end of said shaft. The container also has a fragmentarily shown neck portion 16, suitably bolted or otherwise secured to body portion 17, and an inner cylindrical surface 18 partially defining an annular space 19 about the shaft for substantially accommodating the sealing device of the present invention. Speaking in general, the sealing device includes an inner abutment-ring assembly 20 disposed within an outwardly facing, annular recess 22, of approximately rectangular shape in cross section, formed at the inner end of neck portion 16, a rotor assembly 24 which substantially occupies the annular space 19, and an outer abutment-ring assembly 26, the latter and the other mentioned parts of the sealing device being held in place within the recesses 19 and 22 by a fragmentarily shown bearing cap 28 which is suitably secured by bolts (not shown) to the container neck portion 16, a suitable gasket 30 preferably being disposed between the two last-mentioned parts.

Within the bearing cap 28 is fitted a suitable bearing which, in the drawing, is shown as a ball-bearing 32, the outer ball-race 34 of which seats against the bottom surface 36 of a bearing counterbore 38 in the bearing cap 28, and the ball-bearing's inner ball-race 40 is tightly fitted upon an enlarged portion 42 of the shaft and backs against a side face 44 of an integral, annular flange 46 on the shaft. Means (not shown) are provided for holding the ball-bearing 32 firmly within the bearing cap 28, and said ball-bearing coacts with the flange 46 and with other means (not shown) at the outer end of the ball-bearing 32 to oppose end play of the shaft relatively to the container portion 16. The flange 46 has an outer cylindrical surface 48 which is slidingly sealingly engaged by a sealing lip 50 of an oil seal 52, which is tightly disposed within an oil-seal counterbore 54 formed in the bearing cap 28, to prevent passage of lubricant from ball-bearing 32 toward the mechanical seal which comprises the two abutment-ring assemblies 20 and 26 and the rotor assembly 24.

The rotor assembly 24 comprises a rigid, metal, inner sleeve 56 formed approximately at its center with a rather thick, radial flange 58, having an outer cylindrical surface 60 which fits with a tight, accurate fit within an inner cylindrical surface 62 formed within an intermediate portion of a rigid, metal, outer sleeve 64. One side of the radial flange 58 abuts a shoulder 66 adjoining one end of cylindrical surface 62 of the outer sleeve, and a radial pin 68 extends tightly through a radial bore 70 in the outer sleeve 64 and into a radial bore 72 in the inner sleeve 56 to fix the two said sleeves tightly together against any possible relative movement therebetween.

The radial dimension of the flange 58 of the inner sleeve is such as to provide annular spaces 74 and 76 between and at opposite ends of the assembled sleeves 56 and 64. As it is desired that the juncture of the outer surface of the radial flange 58 be fluidtight relatively to the outer sleeve 64 at the cylindrical surfaces 60 and 62, a rubber O ring 78 or equivalent packing means is preferably employed as a gasket within an annular groove 80 formed within the outer sleeve 64 in opposition to outer cylindrical surface 60 at the radial flange 58, thereby affording fluid-tightness at the two cylindrical surfaces 60 and 62.

The inner sleeve 56 fits loosely enough upon shaft 10 to be easily slid thereonto in assembly of the device and is fluid-sealed relatively to the shaft by rubber O rings 82, 84, or equivalent packing means, disposed within suitable, inner, annular grooves in the sleeve 56. The inner sleeve 56 abuts at its outer end against the inner side face of the integral flange 46 on the shaft and is held against the last-mentioned flange by a rigid, metal, stop-ring 86 at its inner end, which stop-ring, in turn, is held in place by a more or less conventional, resilient, split snap-ring 88, seated partly within an annular groove 90 formed in the shaft 10 and protruding into axial abutment with said stop-ring. The sleeve 56 is constrained by a key 91 to turn with shaft 10.

Substantially within the outer sleeve 64, toward the latter's inner end, is disposed a rigid, rotary sealing ring 92 preferably of stainless steel or other suitable metal or other suitable rigid material, having an enlarged sealing-nose portion 94 disposed freely within a counterbore 96 in the sleeve 64 and an integral sleeve portion 98 which extends into the annular space 74 and abuts one end of a compressed coil spring 100, the other end of which bears against the radial flange 58 of the inner sleeve 56. Thus, despite possible end play or irregular operation of the shaft, the spring 100 urges sealing ring 92 into and maintains it continuously in sliding sealing engagement with a sealing seat 102, which may be of suitable metal, carbon or other rigid material, disposed within a counterbore 104 of a stationary seat-carrier 106 which is disposed within the annular recess 22.

The sleeve portion 98 of the sealing ring 92 has an outer cylindrical surface 108 which is fluid-sealed relatively to the outer sleeve 64 by a suitable packing O ring 110 disposed in an inner, annular, packing-ring groove 112 formed in the outer sleeve 64. As predominant pressures in use of the device, as hereinafter explained, are effective upon the packing ring 110 at its right side, a rigid, anti-extrusion washer 114, which may be of relatively rigid plastic material or other suitable rigid material, may be disposed in the groove 112 at the left side of said packing ring.

The sealing ring 92 is constrained to turn with the sleeve 64 by a set-screw 116, which is threaded into the enlarged, sealing-nose portion of the rotary sealing ring 92 and extends outwardly therefrom into an axially extending slot 118 formed in and toward the outer end of the sleeve 64. The set-screw slides freely in the slot 118 to permit axial movement of the sealing ring 92 relatively to the outer sleeve 64, and the mentioned set-screw also serves the purpose of maintaining the sealing ring 92 unitarily associated with the sleeves 56 and 64 when the latter are removed as a unit from the shaft 10.

The stationary seat-carrier 106 is held in place by the force of spring 100 and is sealed at its outer periphery, with respect to an opposed cylindrical surface of container neck portion 16, by a suitable packing gasket such as, for example, a rubber O ring 120 retained within an outer, annular groove 122 in the seat-carrier. The latter is restrained against material rotation by means of one or more (three, as illustrated) pins 124 which are tightly fixed within bores 126 in container body portion 17 and protrude loosely into bores 128 in the seat-carrier 106.

The sealing seat 102 may be accurately, but not necessarily tightly, fitted in the counterbore 104 and may be sealed at its outer periphery to the seat-carrier 106 by a suitable packing ring 130 disposed in an annular groove 132 in a surrounding portion of said seat-carrier and held in said groove by a swaged-in, annular lip 134. The inner periphery of the sealing seat 102 is sealed, with respect to an opposed cylindrical surface 136 of the container body portion 17, by a suitable packing ring 138 in an inner, annular rabbet 140 in sealing seat 102. The packing ring 138, as thus positioned, not only effects a seal between the inner periphery of the sealing seat 102 and the container body portion 17, but also prevents fluid from passing between the latter and the inner periphery of the seat-carrier 106. It is obvious that, by the just-described arrangement, the seat 102 is securely held in place and protected by the carrier 106 against forces which might cause breakage of the seat 102, particularly if the latter is formed of carbon as hereinbefore suggested.

In its fundamentals, the mechanical seal just described, which is disposed at the inner end of the assembly of sleeves 56 and 64, is duplicated toward the outer ends of said sleeves (in which substantially similar parts bear reference characters similar to those hereinbefore employed with reference to the innermost mechanical seal but with the suffix *a* added thereto). The mechanical seal arrangement, as illustrated at the outer ends of said sleeves, shows the possibility of revising the mechanical seals in certain respects. Thus, the sleeve portion 98*a* of sealing ring 92*a* may be formed with a counterbore 142, into which compressed spring 100*a* may extend, thereby making the outermost mechanical seal more compact axially than the innermost mechanical seal. Obviously, either or both of the innermost and outermost mechanical sealing devices may be of the more compact arrangement shown at the outer ends of the sleeves 56 and 64, or according to the less compact arrangement shown at the innermost ends of said sleeves. Also, as the space between the inner peripheries of the stationary seat-carrier 106*a* and the sealing seat 102*a* with respect to the opposed portion of the outer surface of sleeve 56 is normally at atmospheric pressure, through vent 146*a*, the outermost mechanical seal need not be provided with a packing ring such as is shown at 138.

The container neck portion 16 is provided with a radial duct 144 opening into annular space 19 and having a connection (not shown) at its outer end through which suitable sealing liquid may be introduced about the seal and maintained under pressure to yield a sealing effect as hereinafter explained. Said container neck portion, also, may be provided with one or more drain ducts 146 to carry off to a suitable receptacle, exteriorly of the container 16, any sealing liquid which may leak past the O packing ring 120 and to exhaust any gas which may leak past the O packing ring 138, thereby preventing fluid pressure from building up in back of seat-carrier 106.

In operation, the gas in the container 16 may be at a pressure dependent largely upon the nature of the liquids or other materials being processed therein. In one usage of the device, the gas pressure may be about 1000 pounds per square inch; and such gas pressure, irrespective of its value, is present at clearance 12 as well as in annular space 74 and in space 74*x* directly between the shaft and the nose portion 94 of sealing ring 92. With the sealing ring 92 and sealing seat 102 shaped and proportioned as illustrated, such gas pressure, obviously, is effective upon sealing ring 92 predominantly at the end of its sleeve 98 so that the gas pressure augments the force of the spring 100 in maintaining the sealing ring 92 in firm sliding sealing engagement with sealing seat 102.

Gas, however, is ordinarily more difficult than liquid to seal against escape; therefore, the present invention provides means by which liquid under pressure is employed in opposition to the gas to prevent its escape. To this end, a suitable sealing liquid such as oil is introduced, through duct 144, into annular space 19 and connected spaces 19*x* and 19*y*, respectively, at the back ends of the nose portions 94 and 94*a* of rotary sealing rings 92 and 92*a*. The sealing liquid, preferably, is maintained in the mentioned spaces, by suitable pumping means (not shown), at a pressure somewhat above the pressure of the gas in the container. Thus, for example, if the gas is at about 1000 pounds pressure per square inch, the pressure of the sealing liquid may be about 1050 pounds per square inch.

Assuming the presence of the just-mentioned relationship of fluid pressures, it is obvious that any tendency toward leakage between the sliding interengaging flat surfaces of the sealing ring 92 and sealing seat 102 or around packing ring 110 would produce leakage, if at all, only of the sealing liquid toward the gas-occupied areas, i. e., of the higher pressure toward the lower pressure. Little if any of such leakage would occur, however, because of the relatively low pressure differential and of the relative ease of sealing the liquid. It would, of course, be quite feasible to determine by simple tests the pressure differential which would prevent material leakage of either the liquid or the gas at the mentioned points, which are the only points at which the sealing ring 92 moves relatively to adjacent parts. All the disclosed O packing rings, of course, are normally suitably compressed within their respective grooves to give initial or normal fluid-tightness, and predominance of fluid pressure, at one side of such a ring, additionally compresses it axially to enhance its sealing effect in a well understood manner.

The pressure of the sealing liquid in the space 19x against the back of the nose portion 94 obviously predominates the force of such pressure applied against the forward end of said nose portion; therefore, the pressure of the sealing liquid, like that of the contained gas, aids the spring 100 in maintaining the sealing ring 92 and sealing seat 102 continuously in sliding sealing engagement. If desired, the areas of the sealing ring 92 and sealing seat 102 which are exposed to fluid pressure may be proportioned differently than shown while, nevertheless, maintaining an adequate seal between the sliding surfaces of the ring 92 and the seat 102.

The principal purpose of the outermost mechanical seal assembly (the parts of which bear the reference characters with *a* suffixes) is to prevent leakage of the sealing liquid outwardly along the shaft to the bearing 32. Such leakage is prevented by the sealing effect derived at the interengaging, sliding flat surfaces of the sealing ring 92*a* and sealing seat 102*a* and by the sealing effect of the packing ring 110*a* which is present between sleeves 98*a* and 64 despite possible relative axial movement of said sleeves due to possible end play of the shaft. With the sealing ring 92*a* designed as illustrated, the liquid pressure thereon is predominant at the back end of nose portion 94*a* so that the liquid pressure augments the force of spring 100*a* in maintaining the sealing ring 92*a* in continuous sliding sealing engagement with sealing seat 102*a* despite end play or irregular operation of the shaft.

It may be noted that the predominance of the pressure of the sealing liquid over that of the gas may be such as to enable the sealing liquid to seep between and lubricate the interengaging, sliding surfaces of the sealing ring 92 and sealing seat 102. As the atmospheric pressure in the space radially inwardly of the interengaging, sliding surfaces of sealing ring 92*a* and sealing seat 102*a* would be much less than the sealing liquid pressure, the bias urging the ring 92*a* against seat 102*a* to permit only lubricating seepage therebetween may be augmented by compressing spring 100*a* to a greater extent than spring 100 and/or by so designing and proportioning the seat 102*a* and the sealing ring 92*a* that the liquid pressure differential effective upon the latter would be greater than that effective upon ring 92.

While certain materials have been suggested herein for some parts of the device, it is understood that when a device is made for use in treating or handling certain substances and gases, the materials selected for the various parts will be such as to be least affected by such substances and gases.

It should be apparent that the inventive concepts hereinbefore set forth may be employed in various arrangements other than those illustrated, without, however, departing from the invention as set forth in the following claims.

I claim:

1. A mechanical shaft seal device for effecting a seal between coaxial portions of two relatively rotatable machine elements one of which is a shaft, said device comprising a rigid outer sleeve and a rigid inner sleeve one of which is adapted to be fixedly, sealingly associated with one of said machine elements, integrating means intermediate the ends of said sleeves, rigidly and fluid-tightly interconnecting them in spaced coaxial relationship to provide open-ended annular spaces therebetween toward opposite ends thereof, and separate, operatively similar, sealing means disposed substantially in each of said annular spaces, such sealing means in each of said spaces comprising a rigid sealing ring extending freely at its one end into its related one of said spaces and adapted, at its other end, to effect a rotative sliding seal with a sealing seat which is associated with the other of said machine elements and disposed in opposed relationship to the open end of said one annular space, spring means in the latter space coacting with said sealing ring to urge the latter toward and maintain it in rotative sliding sealing engagement with such an opposed sealing seat, and annular packing means between opposed, axially extending surfaces of the sealing ring and one of said sleeves to effect a seal therebetween, and the device, further, including slidable interconnections between each of said sealing rings and one of said sleeves, slidably effective axially of the device, to prevent disassociation of said sealing rings from said sleeves and to prevent material rotation of said sealing rings relatively to said sleeves.

2. A device according to claim 1, one of said sleeves being formed with an annular rabbet constituting a part of one of said annular spaces, and the rigid sealing ring related to said one annular space having a shouldered, annular sealing-nose portion at its said other end partially extending axially-slidably into said rabbet; the shoulder of said nose portion facing away from such a sealing seat and being responsive to fluid pressure applied against said nose portion to urge the sealing ring toward said sealing seat.

3. A device according to claim 1, each of said sealing rings having a cylindrical surface toward its said one end and said packing means being sealingly disposed between said cylindrical surface and an opposed cylindrical surface of one of said sleeves, at least one of said sealing rings, further, having separate, radially extending surfaces at opposite sides of said packing means and toward opposite ends of the sealing ring, one of said radially extending surfaces being subject to the imposition thereon of the pressure of sealed fluid and the other of said radially extending surfaces being subject to the imposition thereon of fluid pressure different than that of the sealed fluid.

4. A device according to claim 1, the said inner sleeve being adapted to be fixedly, sealingly associated with the shaft.

5. A device according to claim 4, the said packing means being between an outer cylindrical surface of the sealing ring and an opposed inner cylindrical surface of said outer sleeve, and the said one end of the sealing ring being subject to the imposition thereon of the pressure of the sealed fluid.

6. A device according to claim 5, the said other end of the sealing ring having a surface subject to the pressure of sealing fluid effective to aid in urging the sealing ring toward a related sealing seat.

7. A device according to claim 4, in combination with means on the shaft for preventing axial shifting of said device relatively to said shaft; said last-mentioned means comprising a first abutment, rigid with the shaft and adapted to abut one end of said inner sleeve to prevent shifting of the latter axially of the shaft in one direction and a second abutment comprising a split snap-ring adapted to seat removably within a circumferential groove in the shaft and to abut the other end of said inner sleeve to prevent shifting of the latter axially of the shaft in the opposite direction.

8. A device according to claim 1, in combination with an abutment-ring assembly coacting with one of said rigid sealing rings to effect a rotary sliding seal between said two relatively rotatable machine elements; said abutment-ring assembly comprising an annular seat-carrier, a pin in and extending axially from said other machine element slidably into a recess in said seat-carrier to constrain the latter against rotation relatively to said other machine element, an annular sealing seat disposed adjacent to said rigid sealing ring within an axially facing recess in said seat-carrier, and packing means disposed tightly between said seat-carrier and said other machine element and between said seat-carrier and said sealing seat, said rigid sealing ring being held by said spring means in rotary sliding sealing engagement with said sealing seat and, thereby, holding the latter within said seat-carrier and the seat-carrier against an abutting surface of said other machine element.

No references cited.